United States Patent
Eto et al.

(10) Patent No.: US 9,757,858 B2
(45) Date of Patent: Sep. 12, 2017

(54) GRIPPING DEVICE AND METHOD FOR TAKING OUT AN ARTICLE

(71) Applicant: KABUSHIKI KAISHA TOSHIBA, Minato-ku (JP)

(72) Inventors: Haruna Eto, Kawasaki (JP); Hideichi Nakamoto, Tokyo (JP); Akihito Ogawa, Fujisawa (JP); Takafumi Sonoura, Yokohama (JP); Junya Tanaka, Tokyo (JP); Kazuo Watabe, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 14/996,330

(22) Filed: Jan. 15, 2016

(65) Prior Publication Data

US 2016/0207195 A1    Jul. 21, 2016

(30) Foreign Application Priority Data

Jan. 16, 2015 (JP) .................................. 2015-007004

(51) Int. Cl.
 *B25J 9/16* (2006.01)
 *B25J 15/06* (2006.01)
 *B25J 15/00* (2006.01)

(52) U.S. Cl.
 CPC .......... *B25J 9/1612* (2013.01); *B25J 9/1694* (2013.01); *B25J 15/0052* (2013.01); *B25J 15/0616* (2013.01); *B25J 9/1697* (2013.01); *G05B 2219/39484* (2013.01); *G05B 2219/39558* (2013.01)

(58) Field of Classification Search
 CPC .............................. B25J 9/1612; B25J 9/1694
 USPC .... 294/185, 186, 188, 189, 907; 901/31, 40; 414/927, 737, 727, 752.1
 See application file for complete search history.

(56) References Cited

U.S. PATENT DOCUMENTS 5,041,907 A * 8/1991 Sager .................... B07C 5/3422
                                                                       348/91
5,324,087 A * 6/1994 Shimose ................ B65G 47/91
                                                                       294/185

(Continued)

FOREIGN PATENT DOCUMENTS

JP         9-239682 A     9/1997
JP      2007-160447 A     6/2007

(Continued)

*Primary Examiner* — Paul T Chin
(74) *Attorney, Agent, or Firm* — Oblon, McClelland, Maier & Neustadt, L.L.P.

(57) ABSTRACT

An article handling device includes: a gripper that grips an article; a driver that moves the gripper; an article recognition unit that recognizes a state of the article; a gripping recognition unit that recognizes a gripping state of the gripper; a determination unit that determines whether the gripping state is stable or unstable based on a recognition result of the gripping recognition unit; and a controller that controls a first gripping operation in which the gripper grips the article by a gripping position determined based on the recognition result of the article recognition unit, and, when the gripping state is determined as unstable, controls a second gripping operation in which the gripping position is changed and the gripper re-grips the article.

13 Claims, 16 Drawing Sheets

(56) References Cited

U.S. PATENT DOCUMENTS

| | | | |
|---|---|---|---|
| 6,086,321 A * | 7/2000 | Takahashi | B25J 9/1612 414/793 |
| 6,502,877 B2 * | 1/2003 | Schick | B25J 15/06 294/185 |
| 2003/0038491 A1 * | 2/2003 | Schmalz | B25B 11/005 294/185 |
| 2007/0152619 A1 | 7/2007 | Sugiyama et al. | |
| 2009/0149985 A1 * | 6/2009 | Chirnomas | B65G 1/1373 700/215 |
| 2010/0004778 A1 * | 1/2010 | Arimatsu | B25J 9/1697 700/214 |
| 2010/0239408 A1 * | 9/2010 | Becker | B65G 47/914 414/800 |
| 2012/0029686 A1 | 2/2012 | Ban et al. | |
| 2013/0238125 A1 | 9/2013 | Suzuki | |
| 2014/0277721 A1 * | 9/2014 | Tomo | B25J 15/06 700/253 |
| 2015/0066199 A1 * | 3/2015 | Shimono | B65G 59/04 700/218 |
| 2015/0124056 A1 * | 5/2015 | Ando | B25J 9/1612 348/46 |
| 2015/0203304 A1 * | 7/2015 | Morency | B65G 61/00 414/797 |
| 2015/0344225 A1 | 12/2015 | Nakamura et al. | |
| 2016/0096643 A1 * | 4/2016 | Baylor | B65B 35/38 53/443 |
| 2016/0347558 A1 * | 12/2016 | Eto | B65G 59/04 |

FOREIGN PATENT DOCUMENTS

| | | |
|---|---|---|
| JP | 2010-64155 A | 3/2010 |
| JP | 2010-247959 A | 11/2010 |
| JP | 2012-24903 A | 2/2012 |
| JP | 2013-129034 A | 7/2013 |
| JP | 2013-154457 A | 8/2013 |
| JP | 2013-184278 A | 9/2013 |
| JP | 2015-224125 A | 12/2015 |

* cited by examiner

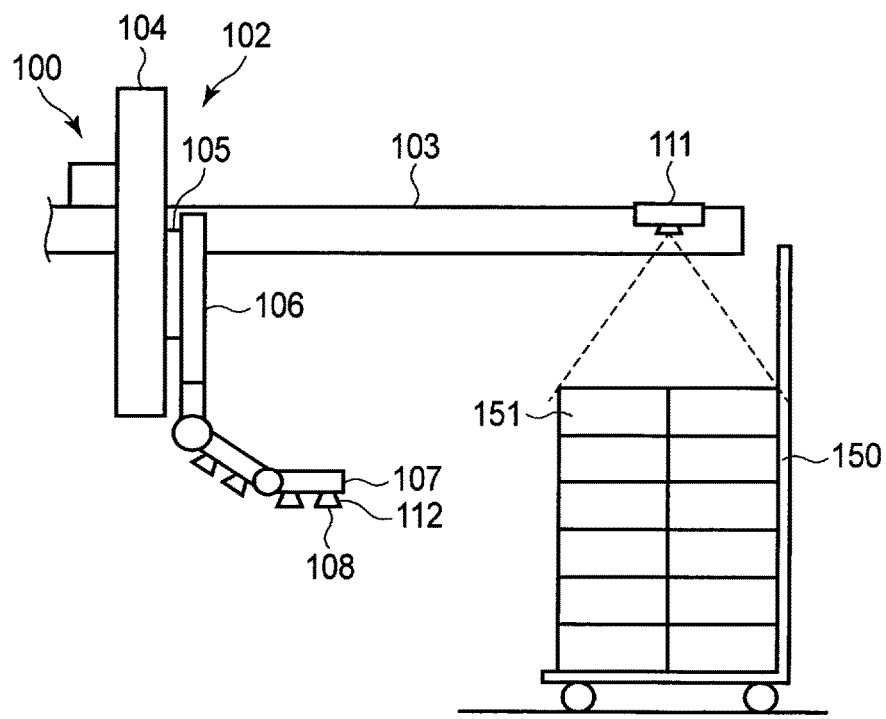
F I G. 1
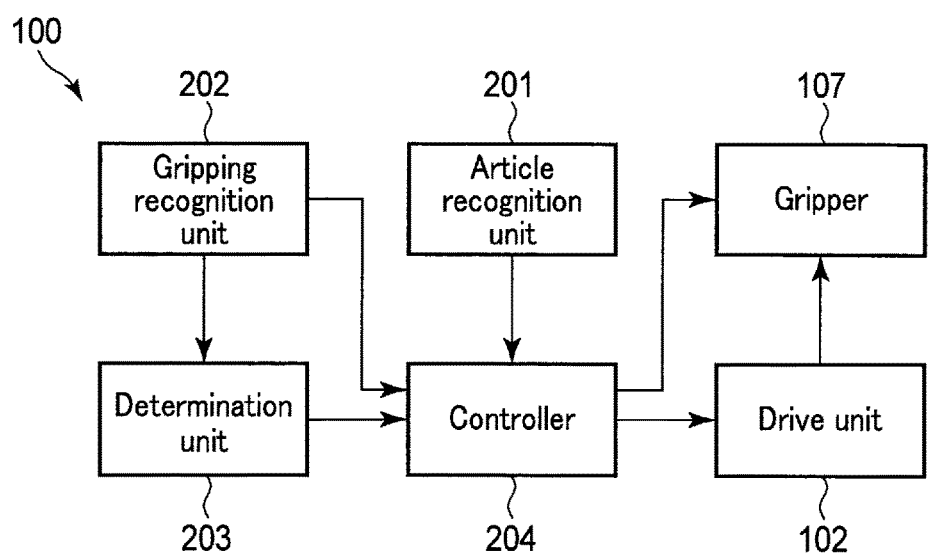
F I G. 2

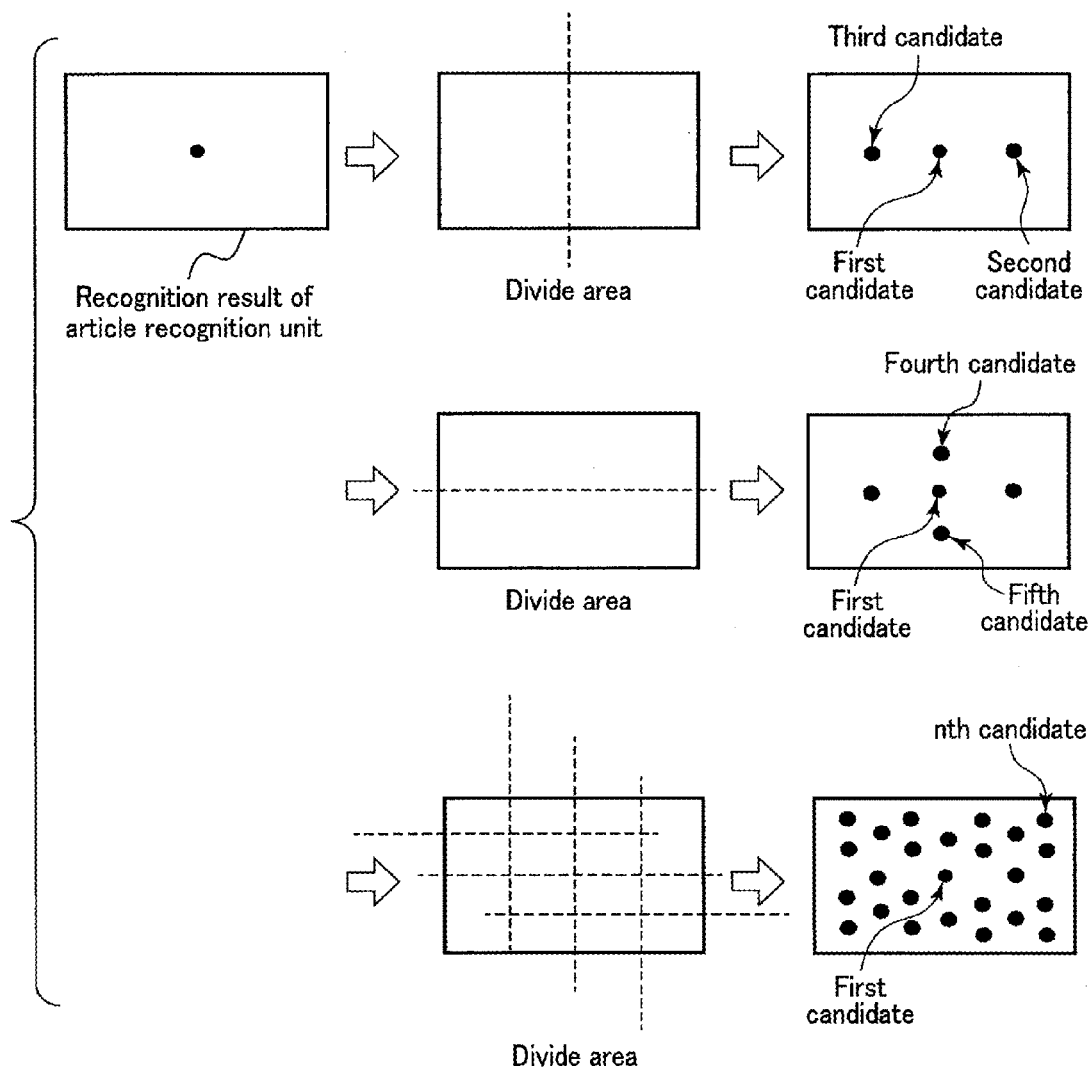
F I G. 13

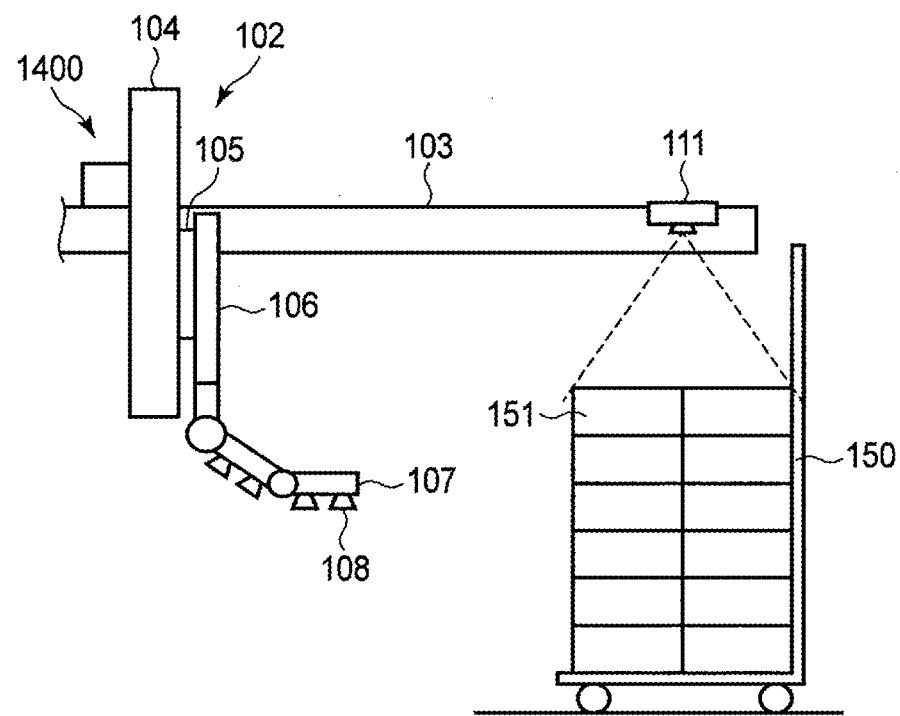
F I G. 14
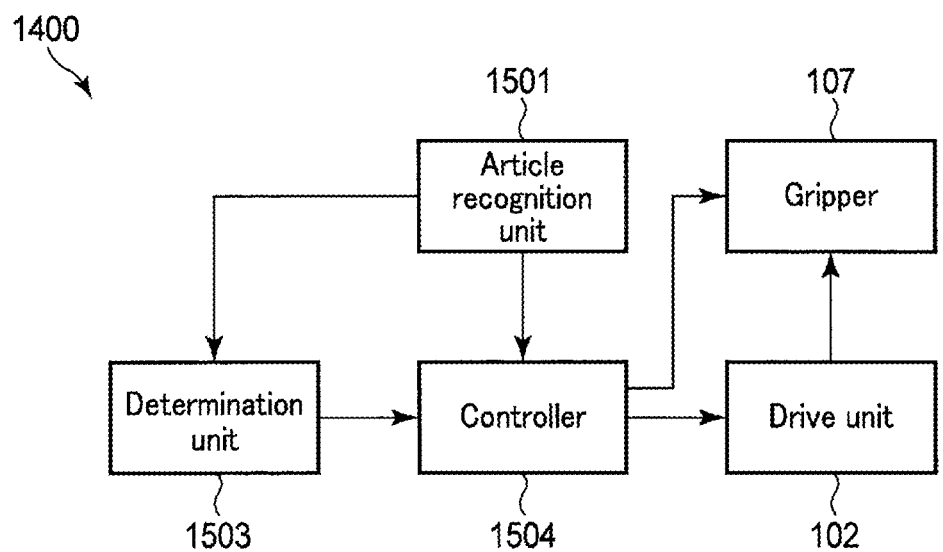
F I G. 15

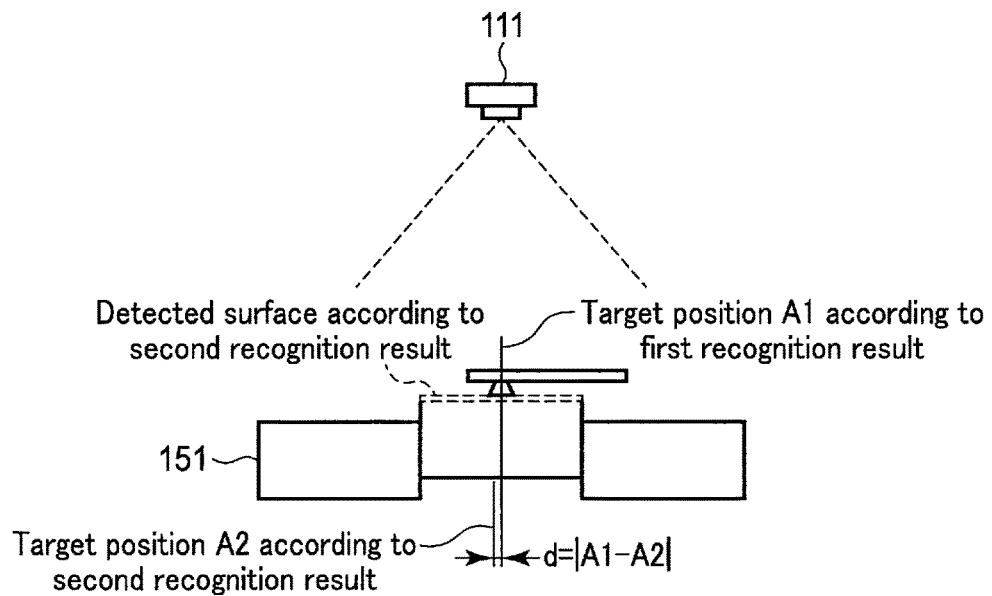
F I G. 16A
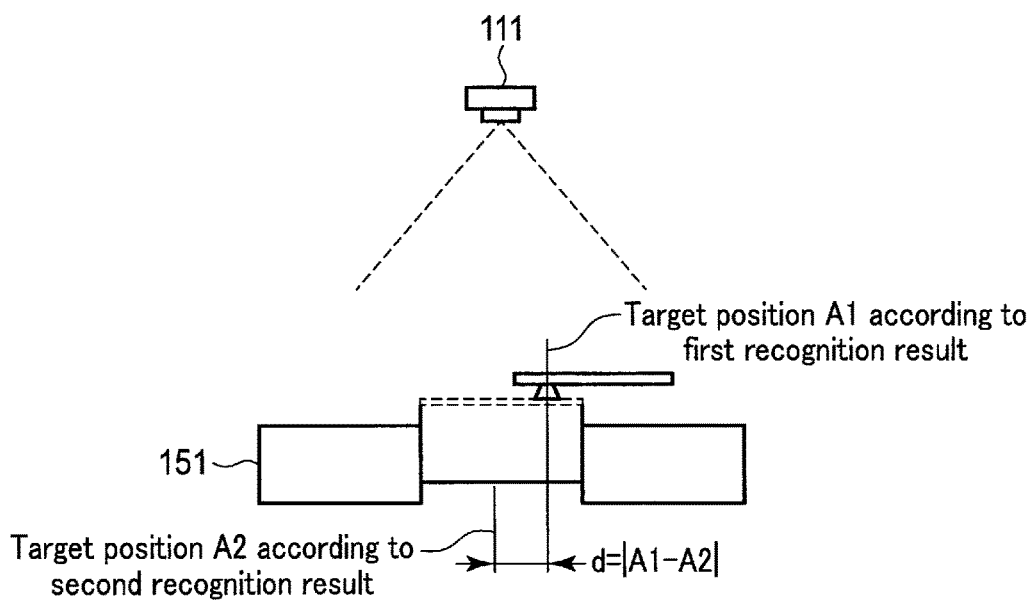
F I G. 16B

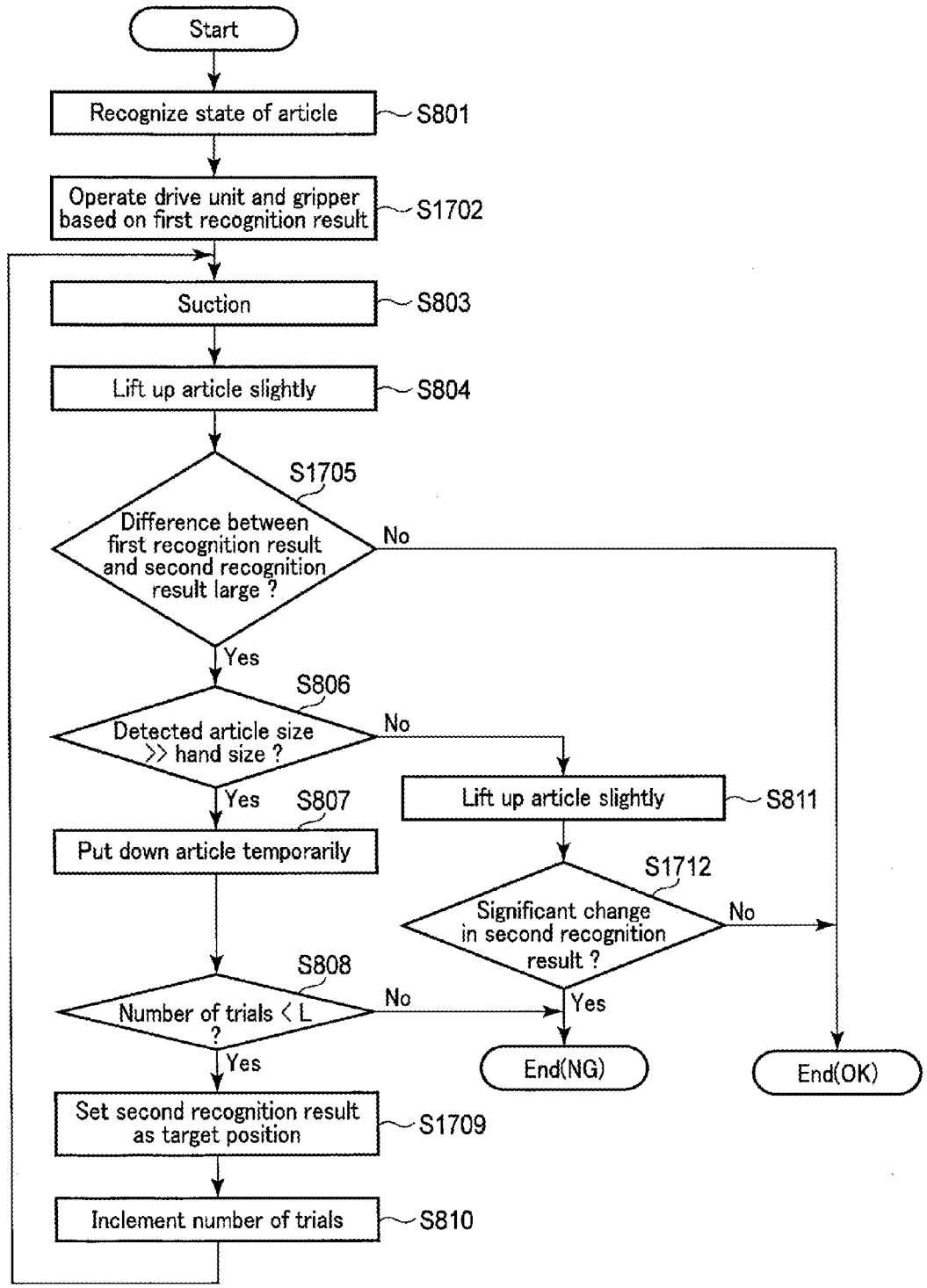
F I G. 17

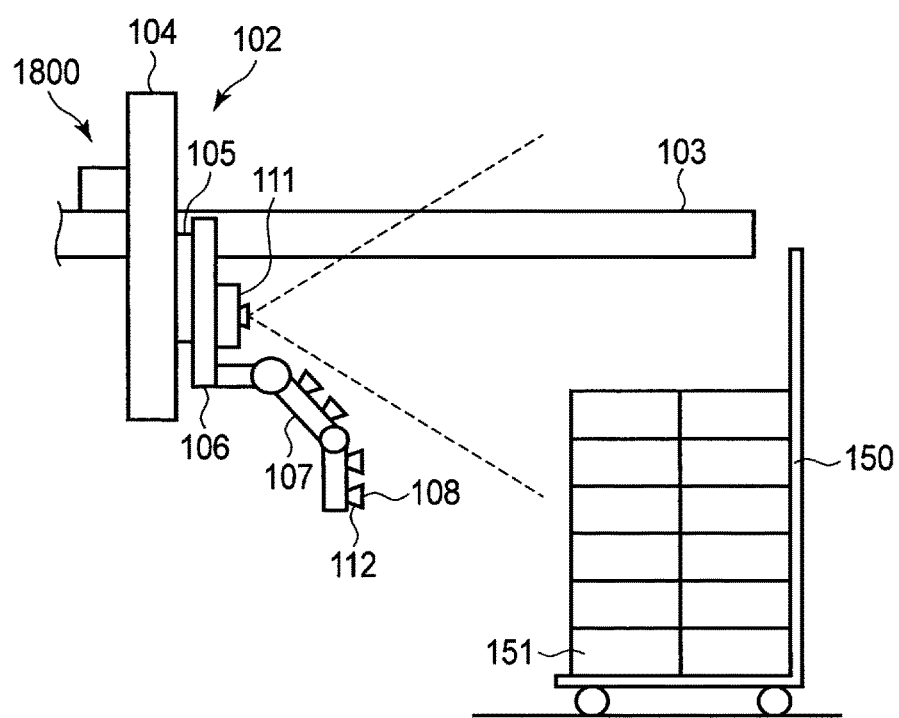
F I G. 18

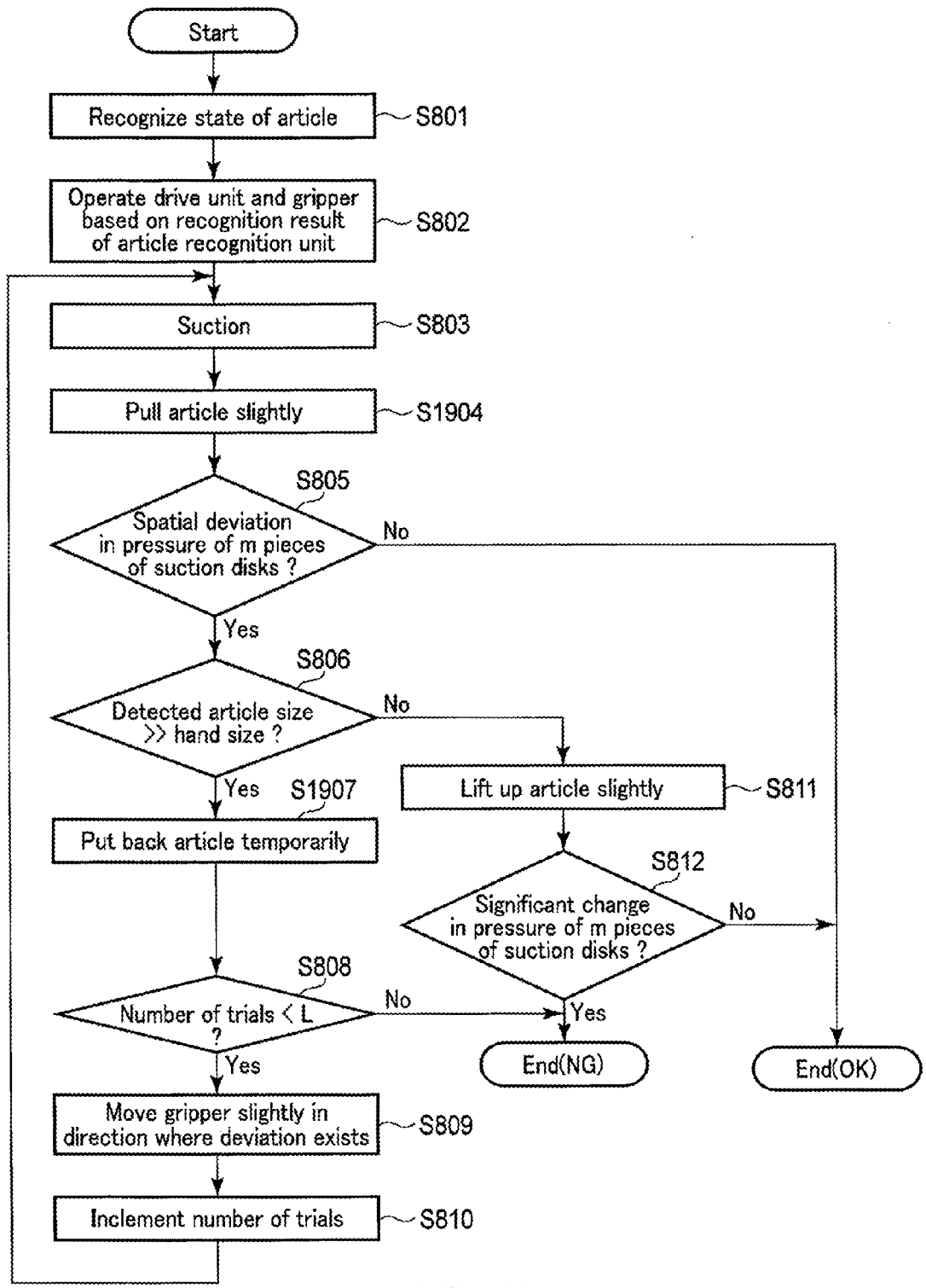
F I G. 19

GRIPPING DEVICE AND METHOD FOR TAKING OUT AN ARTICLE

This application is based upon and claims the benefit of priority from Japanese Patent Application No. 2015-007004, filed Jan. 16, 2015, the entire contents of which are incorporated herein by reference.

FIELD

Embodiments described herein relate generally to an article handling device.

BACKGROUND

Since handling of articles involves heavy labor, in recent years, it is becoming difficult to secure human resources. Therefore, there is a demand for automation of unloading operations, such as depalletizing. In a conventional article handling device for performing unloading operations, an optical sensor, such as an image sensor which is capable of acquiring a wide range of information at once, has been used to recognize articles to be unloaded. However, in cases such as articles having complicated patterns, articles arranged closely in contact with each other without a gap, or the edges of articles being hidden by obstacles such as ropes and labels, due to the nature of optical sensors, recognition would not be performed correctly. If the articles are gripped based on an incorrect recognition result, the gripping may fail.

BRIEF DESCRIPTION OF THE DRAWINGS

FIG. 1 is a side view showing a mechanical structure of an article handling device according to a first embodiment.

FIG. 2 is a block diagram showing a control system of the article handling device according to the first embodiment.

FIG. 13 is a diagram explaining a second example of the first gripping operation according to the modified example of the first embodiment.

FIG. 14 is a side view showing a mechanical structure of an article handling device according to a second embodiment.

FIG. 15 is a block diagram showing a control system of the article handling device according to the second embodiment.

FIG. 16A is a diagram explaining an example of a method for determining whether a gripping state of a gripper is stable or unstable according to the second embodiment.

FIG. 16B is a diagram explaining an example of a method for determining whether the gripping state of the gripper is stable or unstable according to the second embodiment.

FIG. 17 is a flowchart showing an example of an operation performed at the article handling device according to the second embodiment.

FIG. 18 is a side view showing a mechanical structure of an article handling device according to a third embodiment.

FIG. 19 is a flowchart showing an example of an operation performed at the article handling device according to the third embodiment.

DETAILED DESCRIPTION

Figure 3:
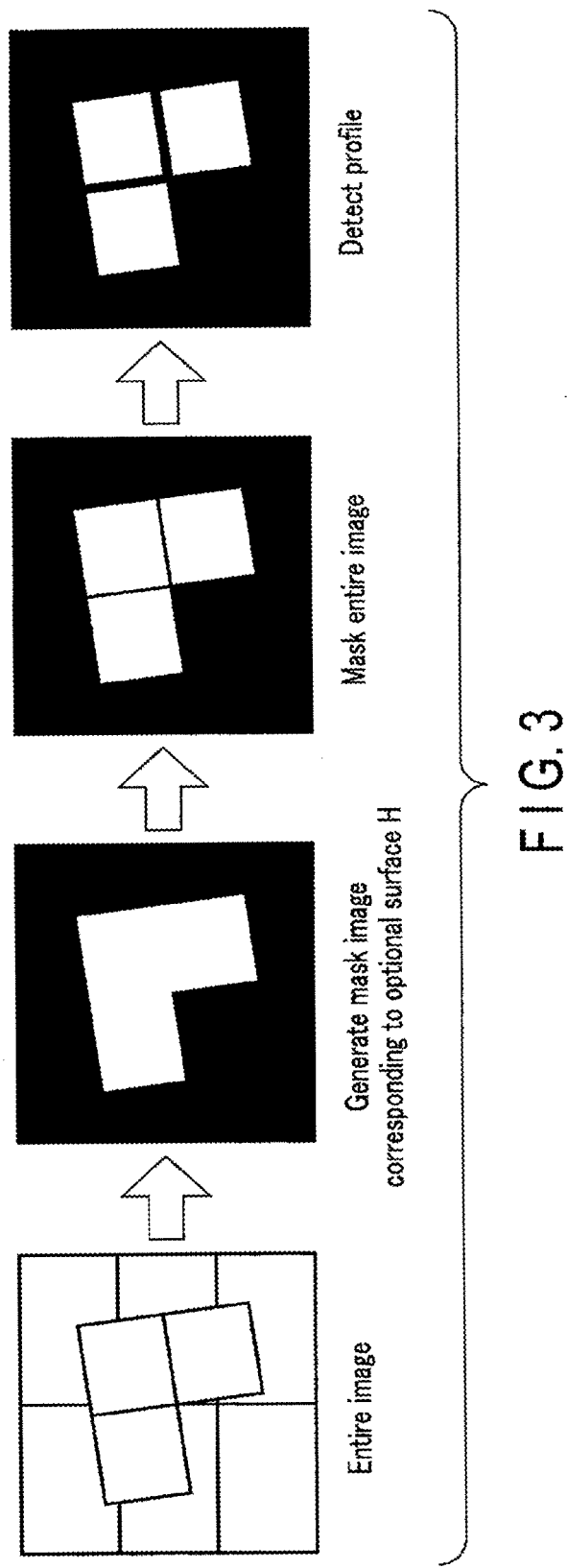
FIG. 3 is a diagram showing an example of a method for detecting articles forming a top surface of a stacked pile.

According to one embodiment, an article handling device includes a gripper, a driver, an article recognition unit, a gripping recognition unit, a determination unit, and a controller. The gripper grips an article. The driver is connected to the gripper and moves the gripper. The article recognition unit recognizes a state of the article arranged in a storage area. The gripping recognition unit recognizes a gripping state of the gripper. The determination unit determines whether the gripping state is stable or unstable based on a recognition result obtained by the gripping recognition unit. The controller controls the gripper and the driver. The controller controls a first gripping operation where the gripper grips the article by a gripping position determined based on the recognition result obtained by the article recognition unit, and, in a case where the gripping state is determined as unstable, controls a second gripping operation where the gripping position is changed and the gripper re-grips the article.

Hereinafter, various embodiments will be described with reference to the drawings. The embodiments are directed to an article handling device which transfers articles from a storage area to an article unloading area. In the following embodiments, elements which perform the same operation will be assigned the same reference numerals, and redundant explanations will be omitted.

First Embodiment

FIG. 1 is a side view schematically showing a mechanical structure of an article handling device 100 according to a first embodiment, and FIG. 2 is a block diagram schematically showing a control system of the article handling device 100 according to the first embodiment. As shown in FIG. 1, articles 151 are stacked on a pallet 150 which is a storage area, and the article handling device 100 approaches from above to grip the articles 151 one by one, and transfers it to an article unloading area (unillustrated). The article unloading area may be, for example, a work table or a conveyor device. The entire pile of articles 151 stacked on the pallet 150 may also be referred to as a stack. The article handling device 100 includes a gripper 107 that grips an article 151, and a drive unit (driver) 102, connected to the gripper 107, that moves the gripper 107.

In the present embodiment, the gripper 107 grips the article 151 by suction. Specifically, the gripper 107 includes a plurality of suction cups (also referred to as suction pads) connected to an unillustrated vacuum pump. The gripper 107 further includes two rotary joints for changing the aspect of the suction cups 108. The drive unit 102 has a triaxial linear motion mechanism. Specifically, the drive unit 102 includes a base 103, a linear motion unit 104 supported by the base 103 in a manner movable in a first direction, a linear motion unit 105 supported by the linear motion unit 104 in a manner movable in a second direction, and a linear motion unit 106 supported by the linear motion unit 105 in a manner movable in a third direction. The first direction, the second direction, and the third direction are respectively orthogonal to each other. The gripper 107 is arranged at the end part of the linear motion unit 106.

The structure of the gripper 107 and the drive unit 102 shown in FIG. 1 is an example. Therefore, the gripper 107 and the drive unit 102 are not limited to the structure shown in FIG. 1. For example, the gripper 107 may grip the article 151 by clamping it.

As shown in FIG. 2, the article handling device 100 further includes an article recognition unit 201, a gripping recognition unit 202, a determination unit 203, and a controller 204. The determination unit 203 and the controller 204 may be realized by a computer including a computing device which is comprised of an integrated circuit (IC) or a large-scale integration (LSI), etc.

The article recognition unit 201 recognizes the state of the article 151. The article recognition unit 201 includes an image sensor 111 shown in FIG. 1. The image sensor 111 is arranged above the pallet 150 and is attached to the base 103 of the drive unit 102 in the example of FIG. 1. The image sensor 111 images the stack and generates image information. The image sensor 111 is equipped with a range sensor and acquires range information together with the image information. The article recognition unit 201 recognizes the state of the article 151 based on the image information and the range information generated by the image sensor 111.

Figure 4:
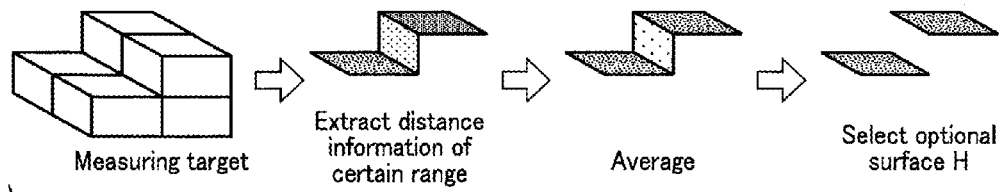
FIG. 4 is a diagram showing an example of a surface selecting method to be utilized for the detection method shown in FIG. 3.

For example, the article recognition unit 201 detects one or a plurality of articles 151 forming the upper surface of the stack based on the image information and the range information. FIG. 3 shows an example of a method for detecting the article 151 forming the upper surface of the stack. As shown in FIG. 3, the article recognition unit 201 generates a mask image corresponding to the upper surface of the stack from the entire image (image information), applies the mask image to the entire image, and detects a profile (or an outline) from the image obtained thereby. The processing for generating the mask image may be implemented by, for example, using a surface selecting method shown in FIG. 4. The surface selecting method shown in FIG. 4 extracts range information of a certain range, averages the extracted result, and selects a desired surface from the surfaces obtained thereby. The article recognition unit 201 outputs, for example, a center position (also referred to as a detected center position) of each article 151 forming the upper surface of the stack as a recognition result. The recognition result may include information regarding a profile of each article 151 forming the upper surface of the stack. A surface specified by the detected profile (corresponding to the upper surface of the article) is referred to as a detected surface.

Figure 5A:
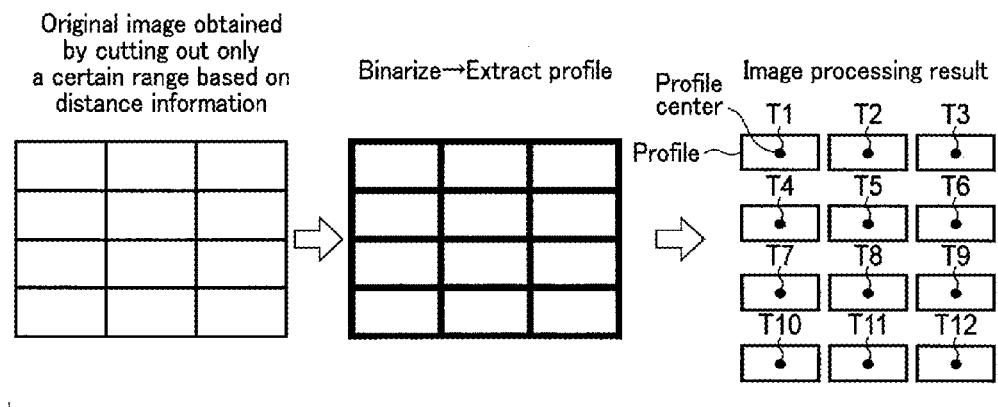
FIG. 5A is a diagram showing an example of a recognition result output by an article recognition unit.
Figure 5B:
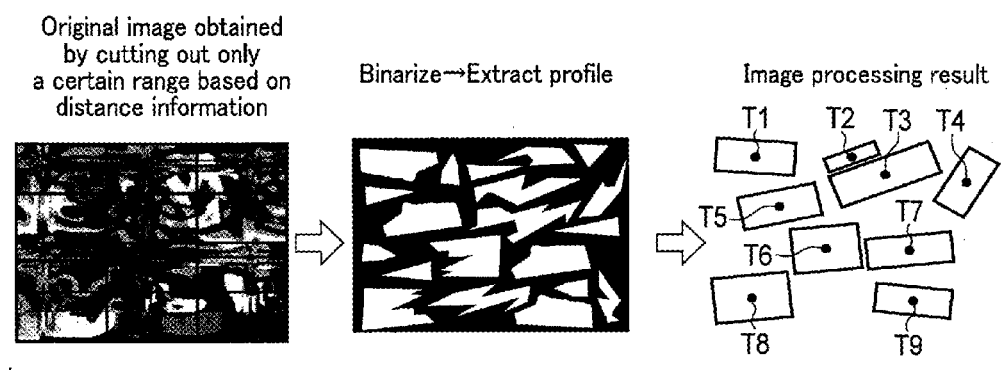
FIG. 5B is a diagram showing another example of a recognition result output by the article recognition unit.
Figure 5C:
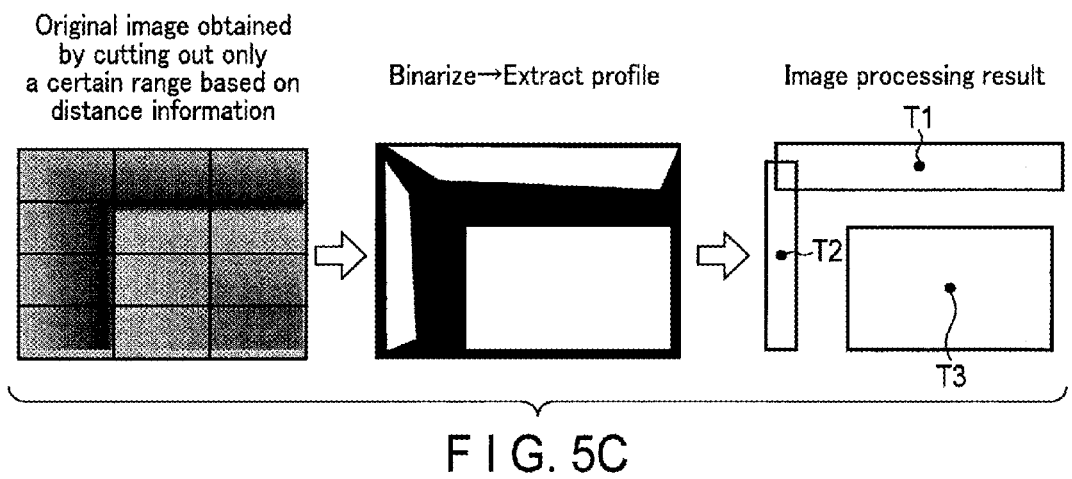
FIG. 5C is a diagram showing yet another example of a recognition result output by the article recognition unit.

FIG. 5A, FIG. 5B, and FIG. 5C show examples of a possible recognition result obtained by the article recognition unit 201. The upper surface of the stack is formed of 12 articles in the same shape. FIG. 5A shows a recognition result in the case where image information is obtained under ideal conditions. In such case, the boarder between articles is correctly recognized, and all of the articles are detected correctly. Points T1 to T12 show the center position of articles forming the upper surface of the stack.

FIG. 5B shows a recognition result obtained in the case where there are wrinkles, patterns, or smudges on the upper surface of the articles, or in the case where a label with high contrast is attached to the articles. In such case, nine articles, having irregular shapes, are detected that are smaller than they actually are. FIG. 5C shows a recognition result obtained in the case where articles with hard and sharp edges are aligned without gaps. In such case, the boarder between the actual articles can hardly be recognized, and it may be assumed that shadows, etc. of other unrelated objects from indoor lighting will be erroneously recognized as the boarder between the articles. When the articles are gripped based on such erroneous recognition result, the articles may be lifted at a position away from its center. In such case, the posture of the article may tilt as the article is lifted, causing the other loaded articles to collapse, or causing the article to drop during transportation. As other possibilities, failure in suction by attempting to perform suction on a gap between articles, etc. may cause a state in which processing is forced to be suspended.

The article recognition unit 201 is not limited to using the image sensor 111, and may also use other sensors that are capable of acquiring information regarding articles. An image sensor is preferable since it is capable of comprehensively acquiring information of a target.

The gripping recognition unit 202 recognizes the gripping state of the gripper 107. In the present embodiment, the gripping recognition unit 202 includes a plurality of pressure sensors 112 shown in FIG. 1. Each pressure sensor 112 is provided inside a corresponding suction cup or inside a corresponding suction system and detects the internal pressure of the corresponding suction cup 108. For example, the gripping recognition unit 202 outputs pressure values detected by a plurality of pressure sensors 112 as a recognition result. The pressure sensor 112 is an example of a force sensor detecting the force acting on the suction cup 108. For example, instead of the pressure sensor 112, a triaxial force sensor or three axial force sensors may be provided on each of the suction cups 108.

Figure 6A:
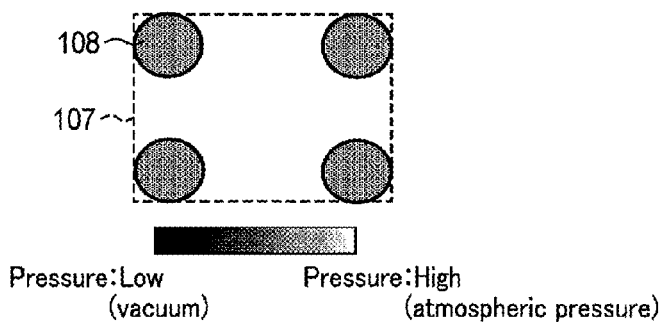
FIG. 6A is a diagram showing an example of a recognition result output by a gripping recognition unit in a case where four suction cups are provided on a gripper.
Figure 6B:
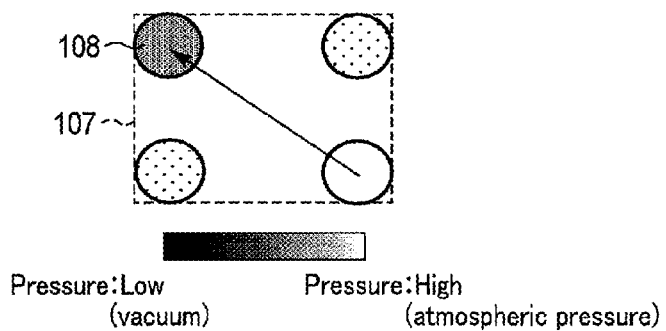
FIG. 6B is a diagram showing another example of a recognition result output by the gripping recognition unit in a case where four suction cups are provided on the gripper.
Figure 7A:
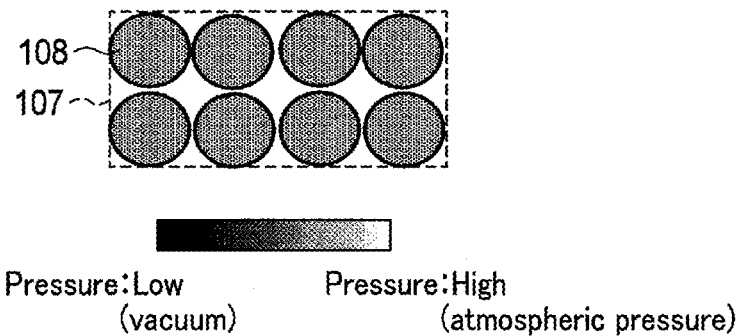
FIG. 7A is a diagram showing an example of a recognition result output by the gripping recognition unit in a case where eight suction cups are provided on the gripper.
Figure 7B:
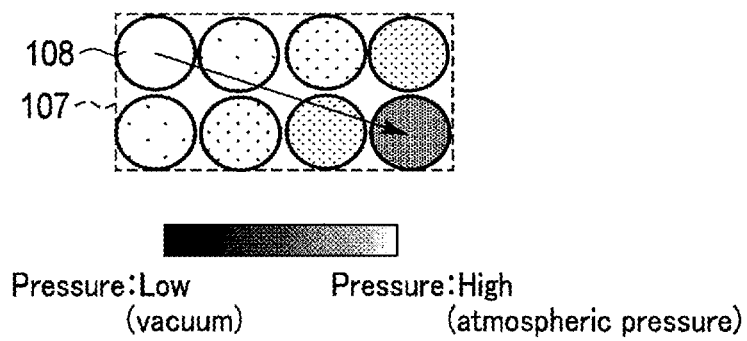
FIG. 7B is a diagram showing another example of a recognition result output by the gripping recognition unit in a case where eight suction cups are provided on the gripper.

The determination unit 203 determines whether the gripping state of the gripper 107 is stable (favorable) or unstable (unfavorable) based on the recognition result obtained by the gripping recognition unit 202. FIG. 6A and FIG. 6B show an example of a recognition result obtained by the gripping recognition unit 202 in a case where four suction cups 108 are provided on the gripper 107. FIG. 7A and FIG. 7B show an example of a recognition result obtained by the gripping recognition unit 202 in the case where eight suction cups 108 are provided on the gripper 107. In the recognition results shown in FIG. 6A and FIG. 7A, the pressure of all of the suction cups 108 is a small value. In the recognition results shown in FIG. 6B and FIG. 7B, suction cups 108 with pressure close to atmospheric pressure and suction cups 108 with small pressure exist, causing a gradient in the pressure value (spatial deviation).

In the present embodiment, in the case where the pressure of each suction cup 108 is smaller than a threshold value, the suction cup 108 is regarded to have succeeded in suction, and in the case where the pressure of each suction cup 108 is equal to or greater than the threshold value, the suction cup 108 is regarded to have failed in suction. As shown in FIG. 6A and FIG. 7A, in the case where the total pressure of a plurality of suction cups 108 is smaller than the threshold value, the determination unit 203 determines that the gripping state is stable. As shown in FIG. 6B and FIG. 7B, in the case where spatial deviation has occurred in the pressure of the suction cups 108, the determination unit 203 determines that the gripping state is unstable.

A method of determining whether the gripping state is stable or unstable is not limited to the examples mentioned above. For example, requirements for determining that the gripping state is stable may be relaxed. Specifically, in the case where a plurality of suction cups 108 (for example, eight) are provided, even if the pressure of a part of the suction cups 108 (for example, two) is equal to or greater than a threshold value, if the pressure of most of the part of the suction cups 108 (for example, six) is smaller than the threshold value, the gripping state may be determined as stable.

The detection does not necessarily have to be performed by an analog value. In the case of detecting by a digital value, the number of sensors should be three or more, or the number of suction trials should be three times or more.

The controller 204 controls the drive unit 102 and the gripper 107. The controller 204 determines an initial gripping position based on the recognition result obtained by the article recognition unit 201, and makes the gripper 107 grip an article 151 at the determined initial gripping position. Specifically, the controller 204 sets the detected center position as the target value of the reference position of the gripper 107 (for example, the center position of a gripping surface), moves the gripper 107 so that the reference position of the gripper 107 matches the detected center position, and operates the vacuum pump of the gripper 107. In the present embodiment, a gripping operation based on the recognition result obtained by the article recognition unit 201 will be referred to as a first gripping operation. At this time, whether the gripping state of the gripper 107 is stable or unstable is determined by the determination unit 203.

In the case where the gripping state is determined as stable, the controller 204 continues to transfer the article 151. In the case where the gripping state is determined as unstable, the controller 204 controls a second gripping operation in which the gripping position is changed and the gripper 107 re-grips the article 151. Specifically, the controller 204 makes the gripper 107 release the article 151, changes the gripping position, and makes the gripper 107 re-grip the article 151. As the method for changing the gripping position, for example, a method of determining a new gripping position randomly, or a method of determining a new gripping position based on the recognition result obtained by the gripping recognition unit 202 may be considered. The former has an advantage in that the calculation amount is small. As for the latter, for example, as shown by the arrow in FIG. 6B, a method of shifting the gripping position toward a suction cup 108 having small pressure may be used. The shifting amount (offset amount) may be predetermined, or may be determined based on the size of the detected surface. The probability of the determination method based on the recognition result obtained by the gripping recognition unit 202 being able to improve the gripping state is high. The second gripping operation may be controlled repeatedly until the gripping state is determined as stable.

In the present embodiment, by changing the gripping position and re-gripping the article in a case where the gripping state is determined as unstable, even in a case where the state of the article cannot be recognized precisely, the article may be gripped successfully. Therefore, the success rate of article gripping improves. As a result, the articles may be transferred with greater certainty. Furthermore, in the present embodiment, there is no need to register the information of an article (for example, size and shape) in advance.

The operation of the article handling device 100 according to the present embodiment is explained below.

Figure 8:
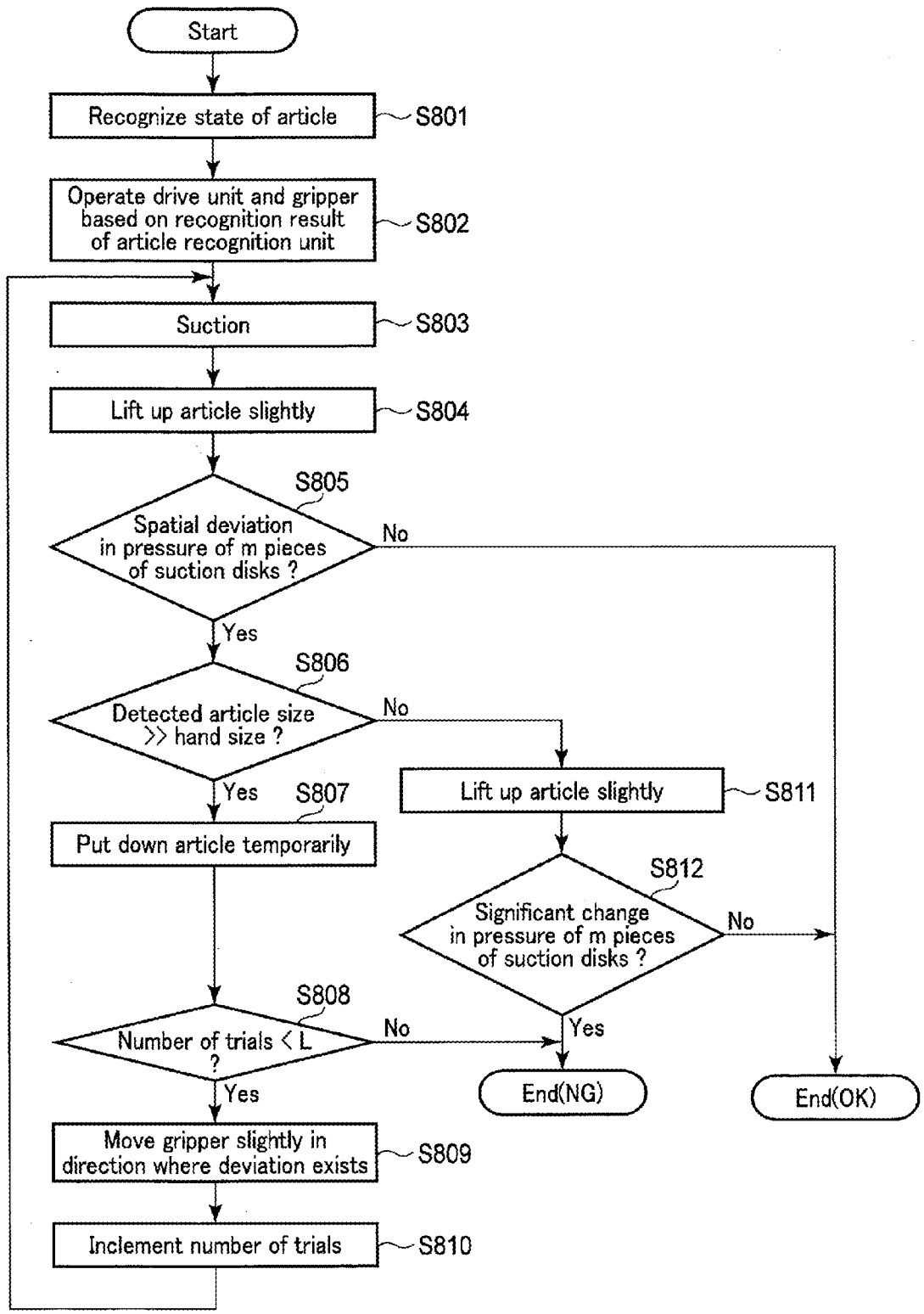
FIG. 8 is a flowchart showing an example of a processing procedure performed at the article handling device according to the first embodiment.

FIG. 8 schematically shows an example of a processing procedure performed at the article handling device 100. The processing procedure shown in FIG. 8 corresponds to a series of processing for gripping one of the one or more articles 151 forming the upper surface of the stack. First of all, the number of trials is reset to one.

In step S801 of FIG. 8, the article recognition unit 201 recognizes the state of the article 151. In step S802, the drive unit 102 and the gripper 107 operate based on the recognition result obtained by the article recognition unit 201. In step S803, the gripper 107 suctions the article 151. In step S804, the controller 204 raises the gripper 107 in order to lift up the article slightly. In step S805, the determination unit 203 determines whether or not there is a gradient (spatial deviation) in the pressure of m pieces of suction cups 108. Here, m is an integer equal to or greater than two. In the case where there is no gradient, the controller 204 continues to transfer the article 151. In the case where there is a gradient, the processing proceeds to step S806.

In step S806, the controller 204 determines whether or not a hand size is sufficiently smaller than the article size. In one example, a hand size is an area of a gripping surface (a surface on which the suction cups 108 are provided) of the gripper 107, and an article size is an area of the detected surface. In another example, the longitudinal and the lateral dimensions of the gripping surface of the gripper 107 may be compared to the longitudinal and the lateral dimensions of the detected surface of the article 151.

In the case where the hand size is almost the same as or is larger than the article size, changing the gripping position may not be expected to improve the situation. Therefore, the controller 204 attempts to transfer the article 151 without changing the gripping position. Specifically, in step S811, the controller 204 raises the gripper 107 in order to lift up the article 151 a little more. In step S812, the controller 204 determines whether or not there is a significant change in the pressure of the m pieces of suction cups 108. In the case where there is no significant change in pressure, the gripping state may be regarded as stable, i.e. the gripping is successful. In this case, the article 151 continues to be transferred. In the case where there is a significant change in pressure, the controller determines that the gripping has failed and ends transferring the article 151.

In the case where the hand size is sufficiently smaller than the article size in step S806, the processing proceeds to step S807. In this case, the controller 204 determines that it is possible to change the gripping position and controls the second gripping operation. In step S807, the controller 204 controls the drive unit 102 and the gripper 107 so as to put down the article 151 temporarily.

In step S808, the controller 204 determines whether or not the number of trials is smaller than the predetermined value L. In the case where the number of trials is smaller than value L, the processing proceeds to step S809. In step S809, the drive unit 102 moves the gripper 107 in a direction where the deviation exists (specifically, towards the suction cup 108 with lower pressure). In step S810, the controller 204 increments the number of trails by one. Subsequently, the processing procedure returns to step S803. In the case where the number of trials is equal to value L in step S808, the controller 204 determines that the gripping has failed and ends transferring the article 151.

In the manner mentioned above, the article handling device according to the first embodiment comprises a gripping recognition unit for recognizing the gripping state of the gripper, and a determination unit for determining whether the gripping state is stable or unstable, where, if the gripping state is unstable, the gripping position is changed and the article is re-gripped. In this manner, the success rate of article gripping may be improved, and the articles may be transferred with greater certainty.

Modified Example of First Embodiment

With reference to FIG. 9 to FIG. 13, the article handling device according to a modified example of the first embodiment will be explained. The article handling device according to the modified example of the first embodiment comprises a configuration that is similar to the article handling device 100 according to the first embodiment shown in FIG. 1 and FIG. 2. In the article handling device according to the modified example of the first embodiment, a part of the operation is different from the article handling device 100 according to the first embodiment. Here, mainly the operations different from the article handling device 100 according to the first embodiment will be explained.

Figure 9:
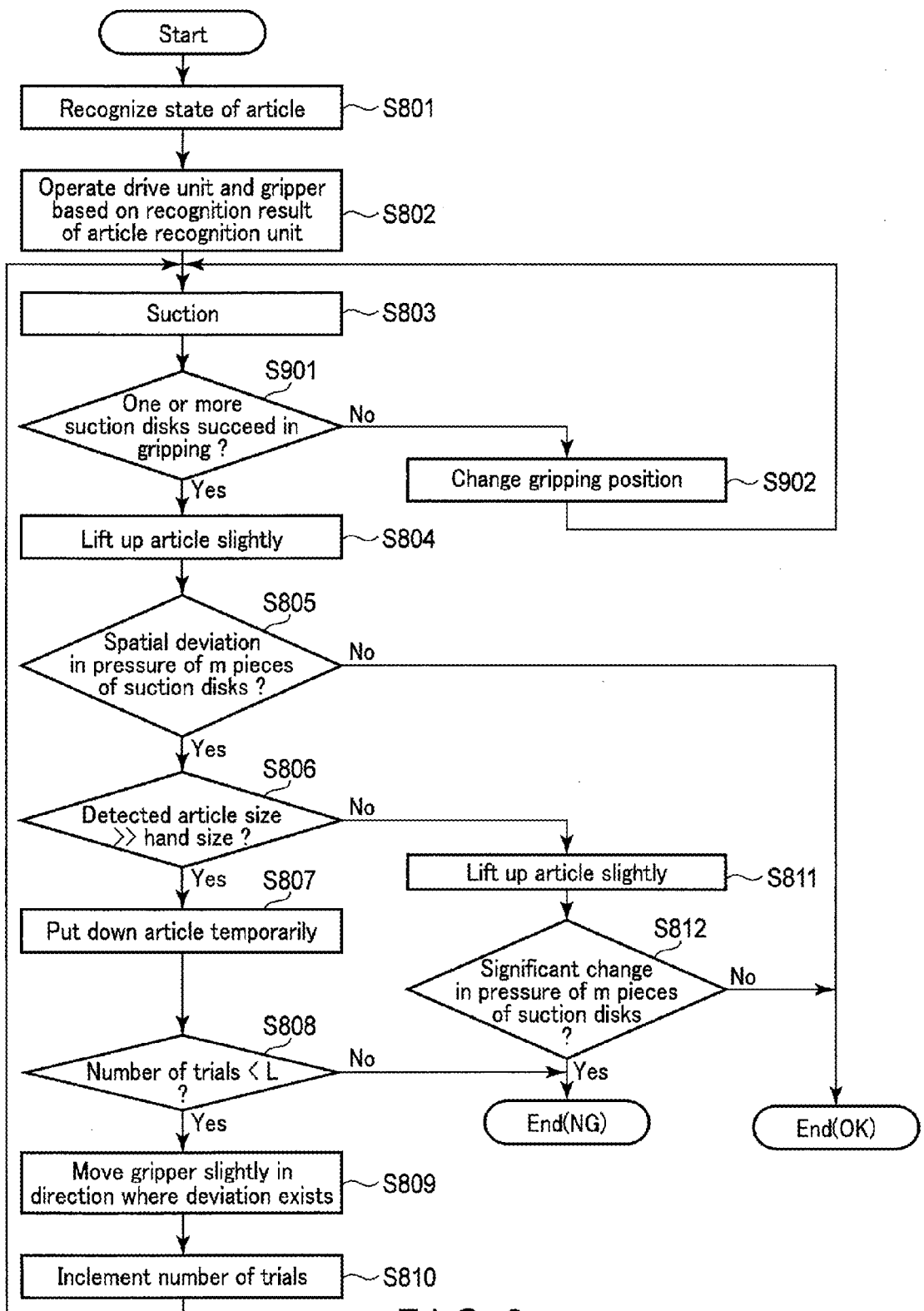
FIG. 9 is a flowchart showing an example of a processing procedure performed at the article handling device according to a modified example of the first embodiment.

FIG. 9 schematically shows an example of a processing procedure of the article handling device according to the modified example of the first embodiment. The processing procedure shown in FIG. 9 is obtained by adding the processing of step S901 and step S902 to the processing procedure shown in FIG. 8. The processing of step S901 and step S902 is added in between the processing of step S803 and step S804. Since the processing in steps S801 to S812 is the same as the processing mentioned above with reference to FIG. 8, explanations will be omitted.

In step S803 of FIG. 9, the gripper 107 suctions the article 151. In step S901, the controller 204 determines whether or not one or more suction cups 108 were successful in gripping. This determination is performed based on, for example, the recognition result obtained by the gripping recognition unit 202. Accordingly, in the first gripping operation according to the modified example of the first embodiment, the recognition result obtained by the gripping recognition unit 202 is used together with the recognition result obtained by the article recognition unit 201.

In the case where no suction cups 108 has been successful in gripping, the processing proceeds to step S902. In step S902, the controller 204 changes the gripping position, and moves the gripper 107. Subsequently, the processing procedure returns to step S803.

In the case where there is one or more suction cups 108 that have been successful in gripping, the processing procedure proceeds to step S804.

In the processing of steps S901 and S902, at least one suction cup 108 suctions the article 151. As a result, the processing of step S804 in which the article 151 is lifted up may be prevented from failing.

A series of processing performed in step S803, step S901, and step S902 will be explained by giving two specific examples.

Figure 10:
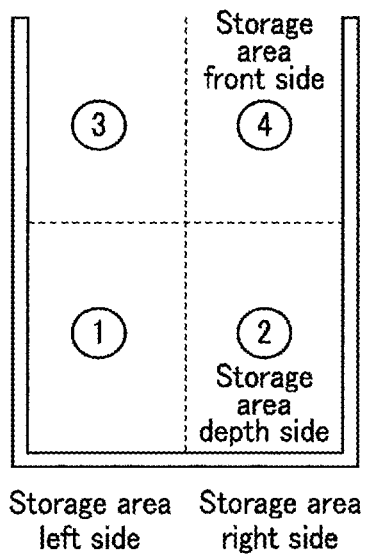
FIG. 10 is a diagram showing an example of a storage area.
Figure 11:
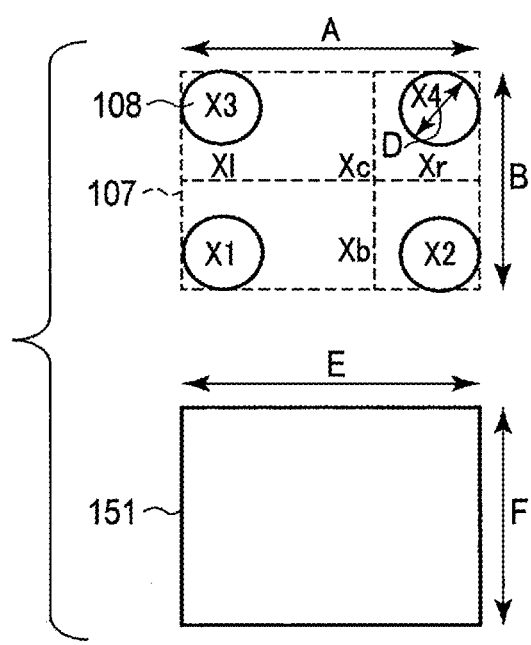
FIG. 11 is a diagram showing a gripping surface of the gripper.

In a first example, a case in which a storage area is separated by wall surfaces provided in three directions is assumed. Specifically, as shown in FIG. 10, articles are stacked in a space defined by wall surfaces in the shape of a "U" when observed from above. Partial areas obtained by dividing the storage area into four will be referred to as partial areas 1 to 4. In this case, a position of the center of gravity of each article exists in one of the partial areas 1 to 4. Furthermore, as shown in FIG. 11, the longitudinal and the lateral dimensions of the gripping surface of the gripper 107 are described as A and B, the diameter of the suction cup 108 is described as D, and the longitudinal and the lateral dimensions of the detected surface of the article 151 are described as E and F. In the example of FIG. 11, four suction cups 108 are arranged on four corners of the gripping surface of the gripper 107. In FIG. 11, position Xc indicates a center position of the gripping surface, position X1 indicates a left side position of the gripping surface, position Xr indicates a right side position of the gripping surface, position Xb indicates a depth side position of the gripping surface, and positions X1 to X4 indicate positions of four suction cups 108. Position X1 is set between position X1 and position X3. Position Xr is set between position X2 and position X4, and position Xb is set between position X1 and position X2. The controller 204 changes the gripping position in accordance with the relationship between width A and length B of the gripper 107, the diameter D of the suction cup 108, and width E and length F of the article 151.

Figure 12A:
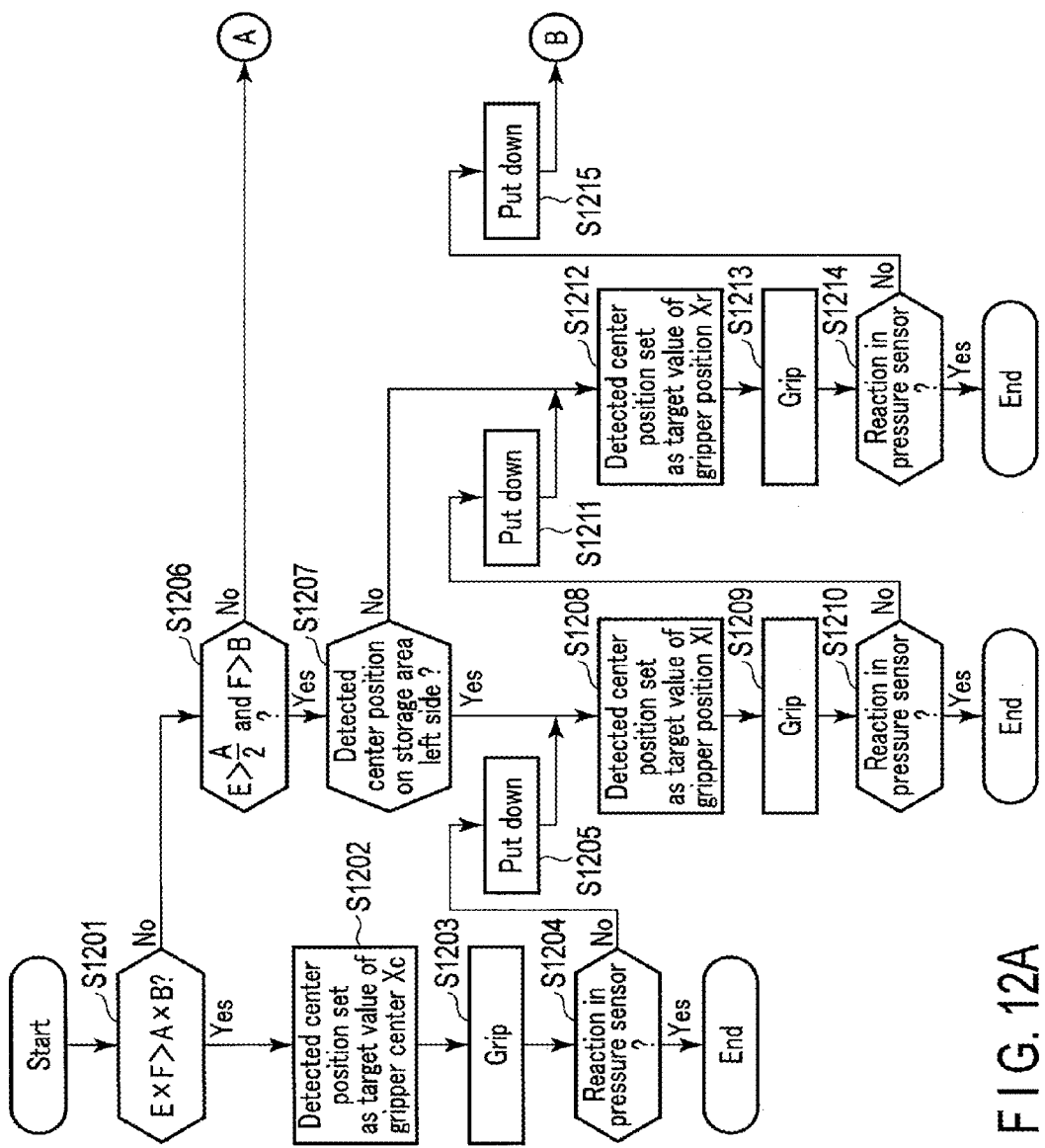
FIG. 12A and FIG. 12B are a series of flow charts showing a first example of a first gripping operation according to the modified example of the first embodiment.
Figure 12B:
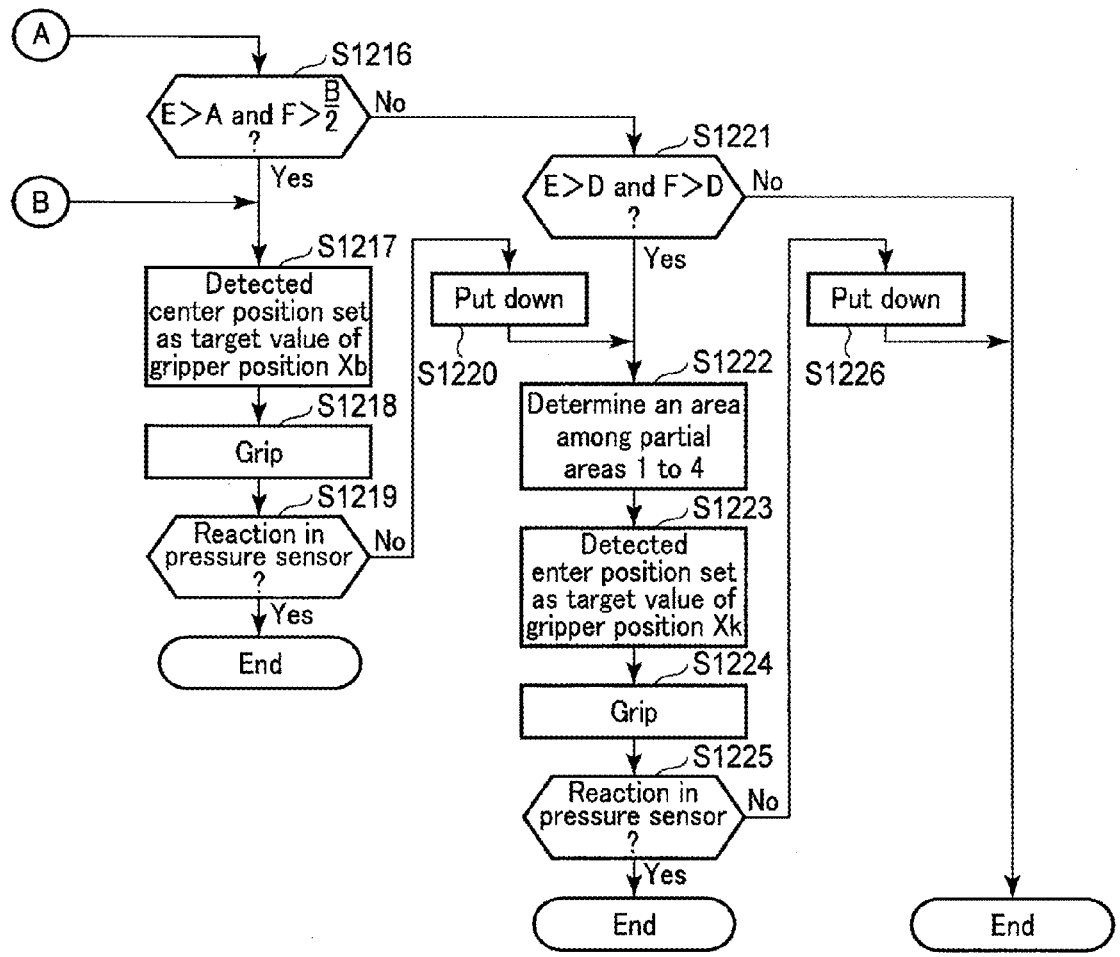

FIG. 12A and FIG. 12B show a series of processing performed in step S803, step S901, and step S902 according to the first example. In step S1201 of FIG. 12A, it is determined whether or not the article size (E×F) is larger than the hand size (A×B). In the case where the article size is larger than the hand size, the processing procedure proceeds to step S1202.

In step S1202, the controller 204 sets the detected center position as the target value of the center position Xc of the gripper 107 and moves the gripper 107. Specifically, the controller 204 moves the gripper 107 so that the center position Xc of the gripper 107 matches the detected center position. In step S1203, the gripper 107 grips the article 151. In step S1204, the controller 204 determines whether or not one or more suction cups 108 succeeded in gripping. In the case where one or more suction cups 108 succeeded in gripping, the processing procedure proceeds to step S804 of FIG. 9. In the case where no suction cups 108 succeeded in gripping, the processing proceeds to step S1207. In step S1207, the gripper 107 releases the article 151. In other words, the controller 204 stops the vacuum pump of the gripper 107. The processing procedure proceeds to step S1208.

In step S1208, the controller 204 sets the detected center position as the target value of position X1 of the gripper 107, and moves the gripper 107. In step S1209, the gripper 107 grips the article 151. In step S1210, the controller 204 determines whether or not one or more suction cups 108 succeeded in gripping. In the case where one or more suction cups 108 succeeded in gripping, the processing procedure proceeds to step S804 of FIG. 9. In the case where no suction cups 108 succeeded in gripping, the processing procedure proceeds to step S1211. In step S1211, the gripper 107 releases the article 151. The processing procedure proceeds to step S1212.

In step S1212, the controller sets the detected center position as the target value of position Xr of the gripper 107 and moves the gripper 107. In step S1213, the gripper 107 grips the article 151. In step S1214, the controller 204 determines whether or not one or more suction cups 108 succeeded in gripping. In the case where one or more suction cups 108 succeeded in gripping, the processing procedure proceeds to step S804 of FIG. 9. In the case where no suction cups 108 succeeded in gripping, the processing procedure proceeds to step S1215. In step S1215, the gripper 107 releases the article 151. The processing procedure proceeds to step S1217 of FIG. 12B.

In step S1217, the controller 204 sets the detected center position as the target value of position Xb of the gripper 107, and moves the gripper 107. In step S1218, the gripper 107 grips the article 151. In step S1219, the controller 204 determines whether or not one or more suction cups 108 succeeded in gripping. In the case where one or more suction cups 108 succeeded in gripping, the processing procedure proceeds to step S804 of FIG. 9. In the case where no suction cups 108 succeeded in gripping, the processing procedure proceeds to step S1220. In step S1220, the gripper 107 releases the article 151. The processing procedure proceeds to step S1222.

In step S1222, the controller 204 determines whether or not the detected center position exists in one of the partial areas 1 to 4. The partial area in which the detected center position is positioned is referred to as partial area k. K is one of 1, 2, 3, or 4. In step S1223, the controller 204 sets the detected center position as the target value of position Xk of the gripper 107, and moves the gripper 107. In step S1224, the gripper 107 grips the article 151. In step S1225, the controller 204 determines whether or not one or more suction cups 108 succeeded in gripping. In the case where one or more suction cups 108 succeeded in gripping, the processing is ended, and the processing proceeds to step S804. In the case where there no suction cups 108 succeeded in gripping, the processing procedure proceeds to step S1226. In step S1220, the gripper 107 releases the article 151. In this case, the controller 204 determines that the gripping has failed and ends transferring the article 151.

In the case where the article size is the same as or smaller than the hand size in step S1201 of FIG. 12A, the processing procedure proceeds to step S1205. In the case where the article size is the same as or smaller than the hand size, the gripper 107 grips the article 151 using a part of the plurality of suction cups 108.

In step S1205, the controller 204 determines whether or not the width E of the article 151 is wider than half the width of the gripper 107 (E>A/2), and the length F of the article 151 is longer than the length B of the gripper 107 (F>B). In the case where E>A/2 and F>B are satisfied, the processing procedure proceeds to step S1207. In step S1207, the controller 204 determines whether or not the detected center position is positioned on the left side of the storage area. In the case where the detected center position is positioned on the left side of the storage area, the processing proceeds to step S1208. In this case, in step S1209 which is the next step of step S1208, the gripper 107 grips the article 151 using two suction cups 108 arranged on the left side. In the case where the detected center position is positioned on the right side of the storage area, the processing proceeds to step S1212. In this case, in step S1213 which is the next step of step S1212, the gripper 107 grips the article 151 using two suction cups 108 arranged on the right side.

In the case where E>A/2 and F>B are not satisfied in step S1205, the processing procedure proceeds to step S1216 of FIG. 12B. In step S1216, the controller 204 determines whether or not the width E of the article 151 is wider than the width of the gripper 107 (E>A), and the length F of the article 151 is longer than half the length of length B of the gripper 107 (F>B/2). In the case where E>A and F>B/2 are satisfied, the processing procedure proceeds to step S1217. In this case, in step S1218 which is the next step of step S1217, the gripper 107 grips the article 151 using two suction cups 108 arranged on the depth side. In the case where E>A and F>B/2 are not satisfied, the processing procedure proceeds to step S1221.

In step S1221, the controller 204 determines whether or not the width E of the article 151 is wider than the diameter D of the suction cup 108 (E>D), and the length F of the article 151 is longer than the diameter D of the suction cup 108 (F>D). In the case where E>D and F>D are satisfied, the processing procedure proceeds to step S1222. In this case, in step S1224 which is a step subsequent to step S1222, the gripper 107 grips the article 151 using one corresponding suction cup 108. In the case where E>D and F>D are not satisfied, the controller 204 determines that the gripping has failed and ends transferring the article 151.

According to the first example mentioned above, while preventing the gripper 107 from colliding against the wall surface, one or more suction cups 108 on the gripper 107 are capable of gripping the article.

In a second example, the recognition result obtained by the article recognition unit 201 includes a plurality of gripping position candidates. FIG. 13 shows an example of a method in which the article recognition unit 201 generates a plurality of gripping position candidates. As shown in FIG. 13, the article recognition unit 201 detects the profile of the article from the image information obtained by the image sensor 111. The article recognition unit 201 sets the center of the detected profile as a first gripping position candidate. The article recognition unit 201 divides the profile along the short dimension direction of the detected profile, and sets the centers of two areas obtained thereby as a second gripping position candidate and a third gripping position candidate. The article recognition unit 201 divides the profile along the long dimension direction, and sets the centers of two areas obtained thereby as a fourth gripping position candidate and a fifth gripping position candidate. In order to obtain a further gripping position candidate, the article recognition unit 201 may further divide the areas.

The controller 204 first makes the gripper 107 grip the article 151 at the first gripping position candidate. Specifically, the controller 204 sets the first gripping position candidate as the target value of the reference position of the gripper 107, moves the gripper 107 so that the reference position of the gripper 107 matches the first gripping position candidate, and makes the gripper 107 grip the article 151. Subsequently, the controller 204 determines whether or not one or more suction cups 108 have succeeded in gripping. In the case where one or more suction cups 108 succeeded in gripping, the processing is ended, and the processing proceeds to step S804. In the case where no suction cups 108 has succeeded in gripping, the controller 204 makes the gripper 107 grip the article 151 at the second gripping position candidate. In this manner, the controller 204 changes the gripping position until one or more suction cups succeed in gripping.

A series of processing performed in step S803, step S901, and step S902 may be implemented by combining the first example and the second example mentioned above.

As mentioned above, according to the article handling device of the modified example of the first embodiment, the success rate of article gripping may be improved by adding a processing in which at least one suction cup 108 suctions the article 151.

Second Embodiment

In the first embodiment, an example of using a pressure sensor provided on a gripper to determine whether a gripping state of a gripper is stable or unstable has been explained. In the second embodiment, an example of using an image sensor to determine whether a gripping state of a gripper is stable or unstable will be explained.

FIG. 14 is a side view schematically showing a mechanical structure of an article handling device 1400 according to the second embodiment, and FIG. 15 is a block diagram schematically showing a control system of the article handling device 1400 according to the second embodiment. As shown in FIG. 14, the article handling device 1400 includes a gripper 107 that grips an article, and a drive unit 102 that supports the gripper 107 and moves the gripper 107. As shown in FIG. 15, the article handling device 1400 further includes an article recognition unit 1501, a determination unit 1503, and a controller 1504.

The article recognition unit 1501 recognizes the state of the article. The article recognition unit 1501 includes an image sensor 111 shown in FIG. 14. The image sensor 111 is arranged above a pallet 150. The image sensor 111 images the stack and generates image information. The image sensor 111 is equipped with a range sensor and acquires range information together with the image information. The article recognition unit 1501 recognizes the state of the article 151 based on the image information and the range information generated by the image sensor 111. The article recognition unit 1501 outputs a profile and a center position of each article forming the upper surface of the stack as a recognition result.

The image sensor 111 images the stack again in a state where the gripper 107 has slightly lifted the article 151 in an attempt to grip the article 151. In the following, a recognition result output by the article recognition unit 1501 before the gripper 107 has gripped the article 151 is referred to as a first recognition result, and a recognition result output by the article recognition unit 1501 in a state where the gripper 107 has lifted up the article is referred to as a second recognition result.

The determination unit 1503 determines whether the gripping state of the gripper 107 is stable or unstable based on the first recognition result and the second recognition result. An example of a method for determining whether the gripping state of the gripper 107 is stable or unstable will be explained with reference to FIG. 16A and FIG. 16B. In FIG. 16A and FIG. 16B, position A1 indicates a detected center position of the article 151 included in the first recognition result, and position A2 indicates a detected center position of the article 151 included in the second recognition result. As shown in FIG. 16A, in the case where the distance d between the position A1 and the position A2 (absolute value of the difference between the position A1 and the position A2) is smaller than a predetermined threshold value do, the determination unit 1503 determines that the gripping state is stable. As shown in FIG. 16B, in the case where the distance d is equal to or greater than the threshold value do, the determination unit 1503 determines that the gripping state is unstable.

The controller 1504 controls the drive unit 102 and the gripper 107. The controller 1504 determines an initial gripping position based on the first recognition result obtained by the article recognition unit 1501, and makes the gripper 107 grip the article 151 at the determined initial gripping position. Specifically, the controller 1504 sets the detected center position as the target value of the reference position of the gripper 107, moves the gripper 107 so that the reference position of the gripper 107 matches the detected center position, and activates a vacuum pump of the gripper 107. In the present embodiment, a gripping processing based on the first recognition result obtained by the article recognition unit 1501 will be referred to as a first gripping operation. At this time, whether the gripping state of the gripper 107 is stable or unstable is determined by the determination unit 1503. In the case where the gripping state is determined as stable, the controller 1504 continues to transfer the article 151. In the case where the gripping state is determined as unstable, the controller 1504 makes the gripper 107 release the article 151, changes the gripping position, and makes the gripper 107 grip the article 151 again. The second gripping operation as described above is repeated until the gripping state is determined as stable.

In the present embodiment, in the case where the gripping state is determined as unstable, the success rate of article gripping may be improved by changing the gripping position, and re-gripping the article. Furthermore, the present embodiment does not require a sensor dedicated for recognizing the gripping state of the gripper 107 (for example, a pressure sensor according to the first embodiment), therefore further cost reductions than in the first embodiment can be attempted. However, the gripper 107 is required to be sufficiently small with respect to the article 151 so that the state of the article 151 can be recognized from the image information acquired in a state where the article 151 is gripped by the gripper 107.

The operation of the article handling device 1400 according to the present embodiment is explained below.

FIG. 17 schematically shows an example of a processing procedure performed at the article handling device 1400. First of all, the number of trials is reset to one. In step S801 of FIG. 17, the article recognition unit 1501 recognizes the state of the article and outputs the first recognition result. In step S1702, the drive unit 102 and the gripper 107 operate based on the first recognition result. In step S803, the gripper 107 suctions the article 151. In step S804, the controller 1504 raises the gripper 107 in order to lift up the article 151 slightly. The article recognition unit 1501 recognizes the state of the article 151 and outputs the second recognition result. In step S1305, the determination unit 1503 determines whether or not the difference between the present target position and the center position of the article 151 obtained by the second recognition result (specifically, distance d mentioned above) is equal to or greater than the threshold value. In the case where the difference is smaller than the threshold value, the controller 1504 continues to transfer the article 151. In the case where the difference is equal to or greater than the threshold value, the processing proceeds to step S806.

In step S806, the controller 1504 determines whether or not a hand size is sufficiently smaller than the article size. In the case where the hand size is almost the same as or is larger than the article size, the processing proceeds to step S811. In step S811, the controller 1504 raises the gripper 107 further in order to lift the article 151 a little more. While raising the gripper 107, the article recognition unit 1501 recognizes the state of the article 151 as needed. In step S1712, the controller 1504 determines whether or not there is a significant change in the second recognition result. Specifically, the controller 1504 determines whether or not the detected surface of the article 151 has significantly changed with time. In the case where there is a significant change in the second recognition result, the controller 1504 determines that gripping has failed and ends transferring the article 151. In the case where there is no significant change in the second recognition result, the controller 1504 continues to transfer the article 151.

In the case where the hand size is sufficiently smaller than the article size in step S806, the processing proceeds to step S807. In step S807, the controller 1504 controls the gripper 107 and the drive unit 102 so that the article is temporarily placed down.

In step S808, the controller 1504 determines whether or not the number of trials is smaller than the predetermined value L. In the case where the number of trials is smaller than value L, the processing proceeds to step S1709. In step S1709, the controller 1504 determines the gripping position based on the second recognition result acquired after step S804, and makes the gripper 107 grip the article 151 by the determined gripping position. Specifically, the controller 1504 sets the center position of the article included in the second recognition result as the target position and moves the gripper 107 so that the reference position of the gripper 107 matches the target position. In step S810, the controller 1504 increments the number of trails only by one. Subsequently, the processing returns to step S803. In the case where the number of trials is equal to value L in step S808, the controller 1504 determines that the gripping has failed and ends transferring the article 151.

As mentioned above, the article handling device according to the second embodiment can produce the same effect as that explained in the first embodiment. Furthermore, since a sensor dedicated for recognizing the gripping state of the gripper need not be provided, further cost reductions than in the first embodiment is achieved.

In order to recognize the gripping state of the gripper more precisely, a different image sensor may be provided on the gripper 107. In this case, the article recognition unit 1501 performs recognition by the image sensor 111 provided above the pallet when prior to the gripping attempted by the gripper 107, and performs recognition by the image sensor provided on the gripper 107 when in a state where the article 151 is gripped by the gripper 107. Performing recognition by the image sensor provided on the gripper 107 allows images to be taken at a close distance, which enables high-resolution image information to be obtained.

Furthermore, the processing explained for the modified example of the first embodiment (specifically, the processing in steps S901 and S902 shown in FIG. 9) may be added to the processing procedure (FIG. 17) according to the second embodiment.

Third Embodiment

In the first embodiment and the second embodiment, a case in which the article is accessed from above the article is explained. In the third embodiment, a case in which the article is accessed from the side of the article will be explained.

FIG. 18 schematically shows a mechanical structure of an article handling device 1800 according to the third embodiment. As shown in FIG. 18, articles 151 are stacked on a pallet 150 which is a storage area, and the article handling device 1800 grips the articles 151 one by one by approaching from the side and transfers it to an unloading area (unillustrated).

The article handling device 1800 has a configuration similar to the article handling device 100 (FIG. 1 and FIG. 2) according to the first embodiment. In other words, the article handling device 1800 comprises a gripper 107, a drive unit 102, an article recognition unit 201 including an image sensor 111, a gripping recognition unit 202 including a pressure sensor 112, a determination unit 203, and a controller 204. The third embodiment is different from the first embodiment in that it is changed to a configuration suitable for the gripper 107 to access from the side, and in that the image sensor 111 is arranged at a position capable of imaging the side surface of the stack. Specifically, in the present embodiment, the suction cup 108 is arranged to face the side surface of the article 151, and the image sensor 111 is attached to a linear motion unit 106 of the drive unit 102.

The operation of the article handling device 1800 according to the present embodiment is explained below.

FIG. 19 schematically shows an operation example of the article handling device 1800. First of all, the number of trials is reset to one. In step S801 of FIG. 19, the article recognition unit 201 recognizes the state of the article 151. In step S802, the drive unit 102 and the gripper 107 are operated based on the recognition result obtained by the article recognition unit 201. In step S803, the gripper 107 suctions the article 151. In step S804, the controller 204 moves the gripper 107 horizontally in order to pull out the article 151 slightly. In step S805, the determination unit 203 determines whether or not there is a gradient (spatial deviation) in the pressure of m pieces of suction cups 108. Here, m is an integer equal to or greater than two. In the case where there is no gradient, the controller 204 continues to transfer the article 151. In the case where there is a gradient, the processing proceeds to step S806.

In step S806, the controller 204 determines whether or not a hand size is sufficiently smaller than the article size. In the case where the hand size is almost the same as or is larger than the article size, the processing proceeds to step S1911. In step S1911, the drive unit 102 moves the gripper 107 further in a horizontal direction in order to pull out the article 151 a little more. In step S812, the controller 204 determines whether or not there is a significant change in the pressure of the m pieces of suction cups 108. In the case where there is no significant change in pressure, the gripping state is regarded as stable, i.e., the gripping is successful. In this case, the article 151 continues to be transferred. In the case where there is a significant change in pressure, the controller 204 determines that the gripping has failed and ends transferring the article 151.

In step S806, in the case where the size of the gripper 107 is sufficiently smaller than the size of the article, the processing proceeds to step S1907. In step S1907, the controller 204 controls the drive unit 102 and the gripper 107 so that the article 151 is temporarily pushed back. The controller 204 may also control the drive unit 102 and the gripper 107 so that the article is simply released.

In step S808, the controller 204 determines whether or not the number of trials is smaller than the predetermined value L. In the case where the number of trials is smaller than value L, the processing proceeds to step S809. In step S809, the controller 204 moves the gripper 107 in the direction where the deviation exists. In step S810, the controller 204 increments the number of trails by one only. Subsequently, the processing returns to step S803. In the case where the number of trials is equal to value L in step S808, the controller 204 determines that the gripping has failed and ends transferring the article.

As mentioned above, the article handling device according to the third embodiment can produce the same effect as that explained in the first embodiment.

Furthermore, the processing explained for the modified example of the first embodiment (specifically, the processing in steps S901 and S902 shown in FIG. 9) may also be added to the processing procedure (FIG. 19) according to the third embodiment.

Also in the embodiment where the article is accessed from the side of the article, an image sensor may be used instead of a pressure sensor for determining the gripping state as is the case of the second embodiment. In such case, the image sensor used for determining the gripping state may be the image sensor 111, or may be an image sensor different from the image sensor 111.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An article handling device comprising:
a gripper which grips an article;
a driver, connected to the gripper, which moves the gripper;
an article recognition unit which recognizes a state of the article arranged in a storage area;
a gripping recognition unit which recognizes a gripping state of the gripper;
a determination unit which determines whether the gripping state is stable or unstable based on a recognition result obtained by the gripping recognition unit; and
a controller which controls the gripper and the driver, wherein the controller controls a first gripping operation in which the gripper grips the article by a first gripping position to transfer the article, the first gripping position being determined based on a recognition result obtained by the article recognition unit, and, in a case that the gripping state in the first gripping operation is determined as unstable, controls a second gripping operation in which the gripper releases the article and re-grips the article by a second gripping position different from the first gripping position.

2. The device according to claim 1, wherein the controller repeats controlling the second gripping operation until the gripping state is determined as stable.

3. The device according to claim 1, wherein
the gripper comprises a plurality of suction cups,
the gripping recognition unit comprises a plurality of force sensors each of which detects a force acting on a corresponding suction cup, and
the recognition result obtained by the gripping recognition unit includes an output value of the plurality of force sensors.

4. The device according to claim 1, wherein the controller determines a new gripping position based on the recognition result obtained by the gripping recognition unit.

5. The device according to claim 1, wherein
the recognition result obtained by the article recognition unit includes a plurality of gripping position candidates including a first gripping position candidate and a second gripping position candidate,
the gripper comprises a plurality of suction cups, and
in a case that all of the plurality of suction cups fail in gripping when the gripper grips the article by the first gripping position candidate, the controller makes the gripper grip the article by the second gripping position candidate.

6. The device according to claim 1, wherein
the gripper comprises a plurality of suction cups,
the gripping recognition unit detects pressure acting on the suction cups in a state that the article is gripped by the gripper, and
the controller determines the second gripping position based on the detected pressure.

7. An article handling device comprising:
a gripper which grips an article;
a driver, connected to the gripper, which moves the gripper;
an article recognition unit which recognizes a state of the article, wherein the article recognition unit generates a first recognition result obtained by performing recognition before the article is gripped by the gripper, and a second recognition result obtained by performing recognition in a state that the article is gripped by the gripper;
a determination unit which determines whether a gripping state of the gripper is stable or unstable based on the first recognition result and the second recognition result; and
a controller configured to control the gripper and the driver, wherein the controller controls a first gripping operation in which the gripper grips the article by a first gripping position to transfer the article, the first gripping position being determined based on the first recognition result, and, in a case that the gripping state in the first tripping operation is determined as unstable, controls a second gripping operation in which the gripper releases the article and re-grips the article by a second gripping position different from the first gripping position.

8. The device according to claim 7, wherein the controller repeats controlling the second gripping operation until the gripping state is determined as stable.

9. The device according to claim 7, wherein
the article recognition unit comprises an image sensor,
the article recognition unit calculates a center position of the article as a first center position based on image information obtained by the image sensor before the article is gripped by the gripper, and calculates a center position of the article as a second center position based on image information obtained by the image sensor in a state that the article is gripped by the gripper, and
the determination unit determines whether or not the gripping state is stable based on a distance between the first center position and the second center position.

10. The device according to claim 7, wherein the controller determines a new gripping position based on the second recognition result.

11. The device according to claim 7, wherein
the first recognition result includes a plurality of gripping position candidates including a first gripping position candidate and a second gripping position candidate,
the gripper comprises a plurality of suction cups, and in a case that all of the plurality of suction cups fail in gripping when the gripper grips the article by the first gripping position candidate, the controller makes the gripper grip the article by the second gripping position candidate.

12. A method for controlling an article handling device comprising a gripper which grips an article and a driver which is connected to the gripper and moves the gripper, the method comprising:
- recognizing a state of the article arranged in a storage area to generate a first recognition result;
- recognizing a gripping state of the gripper to generate a second recognition result;
- determining whether the gripping state is stable or unstable based on the second recognition result;
- controlling a first gripping operation in which the gripper grips the article by a first gripping position to transfer the article, the first gripping position being determined based on the first recognition result; and
- in response to determining that the gripping state in the first gripping operation is unstable, controls a second gripping operation in which the gripper releases the article and re-grips the article by a second gripping position different from the first gripping position.

13. A method for controlling an article handling device comprising a gripper which grips an article and a driver which moves the gripper, the method comprising;
- recognizing a state of the article to generate a first recognition result obtained by performing recognition before the article is gripped by the gripper, and a second recognition result obtained by performing recognition in a state where the article is gripped by the gripper;
- determining whether a gripping state of the gripper is stable or unstable based on the first recognition result and the second recognition result;
- controlling a first gripping operation in which the gripper grips the article by a first gripping position to transfer the article, the first gripping position being determined based on the first recognition result; and
- in response to determining that the gripping state in the first gripping operation is unstable, controlling a second gripping operation in which the gripper releases the article and re-grips the article by a second gripping position different from the first gripping position.

* * * * *